United States Patent
Chung et al.

(10) Patent No.: US 10,198,211 B2
(45) Date of Patent: Feb. 5, 2019

(54) HYBRID MEMORY SYSTEM AND REFRESH METHOD THEREOF BASED ON A READ-TO-WRITE RATIO OF A PAGE

(71) Applicants: SK hynix Inc., Icheon (KR); KOREA UNIVERSITY RESEARCH AND BUSINESS FOUNDATION, Seoul (KR)

(72) Inventors: Sung Woo Chung, Seoul (KR); Young Ho Gong, Seoul (KR); Jae Hoon Chung, Seoul (KR); Hoon Hee Cho, Seoul (KR)

(73) Assignees: SK HYNIX INC., Icheon (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 15/702,499

(22) Filed: Sep. 12, 2017

(65) Prior Publication Data
US 2018/0232173 A1    Aug. 16, 2018

(30) Foreign Application Priority Data
Feb. 15, 2017   (KR) ........................ 10-2017-0020598

(51) Int. Cl.
G06F 3/06        (2006.01)

(52) U.S. Cl.
CPC .......... *G06F 3/0647* (2013.01); *G06F 3/0604* (2013.01); *G06F 3/0653* (2013.01); *G06F 3/0685* (2013.01)

(58) Field of Classification Search
CPC .... G06F 3/0647; G06F 3/0604; G06F 3/0685; G06F 3/0653
See application file for complete search history.

(56) References Cited

U.S. PATENT DOCUMENTS

| | | | |
|---|---|---|---|
| 9,804,966 B1* | 10/2017 | Sadanandan | G06F 12/0862 |
| 9,927,860 B2* | 3/2018 | Huang | G06F 1/3225 |
| 2015/0106582 A1* | 4/2015 | Mai | G06F 3/0649 711/165 |
| 2016/0110126 A1* | 4/2016 | Lee | G11C 11/5628 711/103 |
| 2016/0203854 A1* | 7/2016 | Kim, II | G11C 11/40626 365/222 |

FOREIGN PATENT DOCUMENTS

| | | |
|---|---|---|
| KR | 10-1380602 B1 | 4/2014 |
| KR | 10-2015-0043102 A | 4/2015 |

* cited by examiner

*Primary Examiner* — Richard Elms
*Assistant Examiner* — Jerome Leboeuf

(57) ABSTRACT

A hybrid memory system may include: a volatile memory; a nonvolatile memory; and a memory controller configured to a threshold value for a read-to-write ratio according to a refresh interval of the volatile memory, and to perform migration of a page between the volatile memory and the nonvolatile memory based on the threshold value and a read-to-write ratio of the page.

15 Claims, 3 Drawing Sheets

HYBRID MEMORY SYSTEM AND REFRESH METHOD THEREOF BASED ON A READ-TO-WRITE RATIO OF A PAGE

CROSS-REFERENCE TO RELATED APPLICATIONS

The present application claims priority to Korean Patent Application No. 10-2017-0020598, filed on Feb. 15, 2017, which is incorporated herein by reference in its entirety.

BACKGROUND

1. Field

Embodiments of the present disclosure relate to a semiconductor memory, and more particularly, to a hybrid memory system and a control method thereof.

2. Description of the Related Art

In general, a hybrid memory system includes a volatile memory and a nonvolatile memory. The nonvolatile memory does not consume energy to retain data stored therein. Thus, the nonvolatile memory can efficiently store and manage a large amount of data for a longer period than the volatile memory, thereby reducing energy consumption and costs. However, the nonvolatile memory is slower than the volatile memory when performing read and write operations, and has limited write endurance.

In order to compensate for the drawbacks of the nonvolatile memory, a conventional hybrid memory system migrates a write-intensive page from the nonvolatile memory to the volatile memory in consideration of a write count of each page, thereby improving the write endurance.

Recently, a 3D-stacked DRAM has been used as a volatile memory. Since such a DRAM uses a high clock frequency, the DRAM may require high power consumption per unit area, thereby raising a chip temperature.

In order to retain data at a high temperature, the DRAM needs to perform a refresh operation within a refresh time interval that is shorter than a data retention time. However, when a refresh interval shortens, a refresh operation should be performed more frequently. However, since a general read/write operation cannot be performed while the refresh operation is performed, the performance of the volatile memory may deteriorate.

Therefore, the page migration technique considering only the write count of each page may degrade the performance of the volatile memory due to a short refresh interval, when a temperature of the volatile memory rises.

SUMMARY

Various embodiments are directed to a hybrid memory system capable of performing page migration between a volatile memory and a nonvolatile memory in consideration of a refresh interval, which changes according to a temperature of the volatile memory, and a control method thereof.

In an embodiment, a hybrid memory system may include: a volatile memory; a nonvolatile memory; and a memory controller configured to a threshold value for a read-to-write ratio according to a refresh interval of the volatile memory, and to perform migration of a page between the volatile memory and the nonvolatile memory based on the threshold value and a read-to-write ratio of the page.

In an embodiment, a control method of a hybrid memory system may include the steps of: setting a threshold value for a read-to-write ratio according to a refresh interval; and performing the page migration of a page between a volatile memory and a nonvolatile memory in the hybrid memory system, based on the threshold value and a read-to-write ratio of the page.

DETAILED DESCRIPTION

Figure 1:
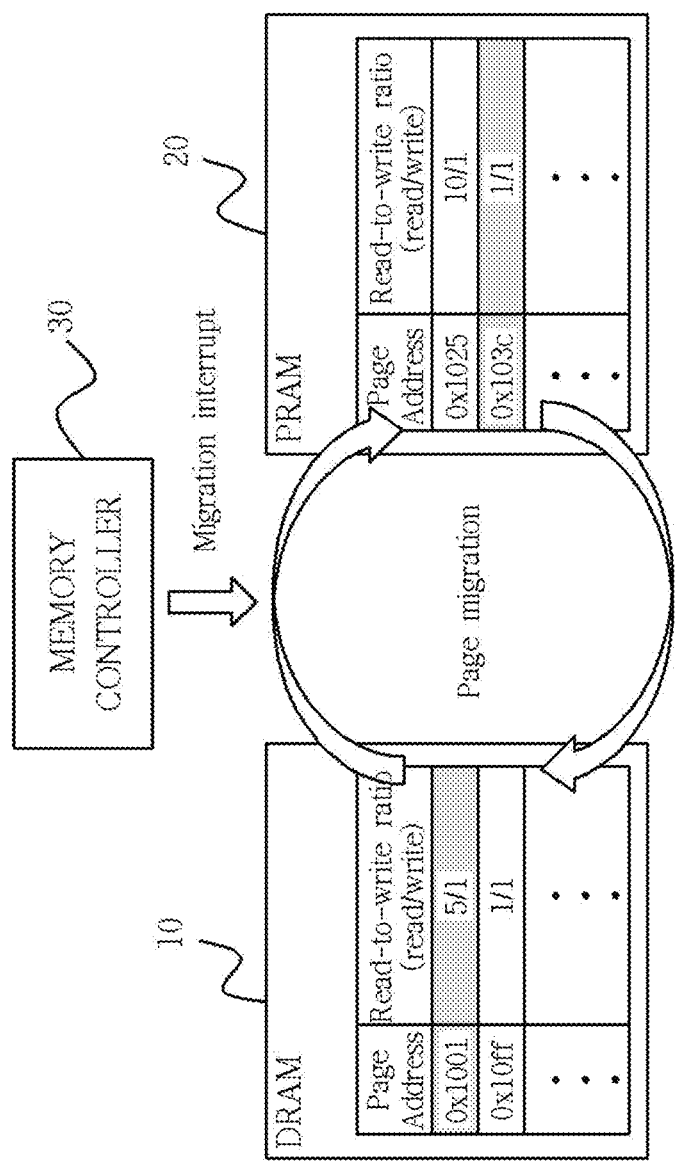
FIG. 1 illustrates a hybrid memory system according to an embodiment.

Various embodiments will be described below in more detail with reference to the accompanying drawings such that this disclosure will be thorough and complete, and will fully convey the scope of the embodiments to those skilled in the art. Throughout the disclosure, like reference numerals refer to like parts throughout the various figures and embodiments of the present invention.

Moreover, detailed descriptions related to publicly known functions or configurations will be ruled out in order not to unnecessarily obscure subject matters of the present invention.

The terms such as 'first' and 'second' may be used to describe various components, but the components are not limited by the terms, and the terms are used only to distinguish one component from another component.

FIG. 1 illustrates a hybrid memory system according to an embodiment.

Referring to FIG. 1, the hybrid memory system includes a volatile memory 10, a nonvolatile memory 20, and a memory controller 30. In FIG. 1, the volatile memory 10 includes a DRAM (Dynamic Random Access Memory), and the nonvolatile memory 20 includes a PRAM (Resistive Random Access Memory). However, embodiments are not limited thereto.

The volatile memory 10 and the nonvolatile memory 20 may have the same capacity, and may constitute a main memory at the same hierarchy while having different physical addresses.

When initially allocating all pages to the main memory, the memory controller 30 may preferentially allocate the pages to the volatile memory 10. In this embodiment, a page can be defined as a unit that identifies a physical capacity of the main memory.

When write-intensive pages are initially allocated to the nonvolatile memory 20, the write endurance may be degraded since the nonvolatile memory 20 performs a write operation slower than the volatile memory 10 and has limited write endurance. Thus, in order to prevent the degradation of the write endurance, the memory controller 30 preferentially allocates all of the write-intensive pages to the volatile memory 10.

In this embodiment, a page for which a write operation is performed more than a preset number of times is referred to as a "write-intensive page."

The memory controller 30 performs page migration between the volatile memory 10 and the nonvolatile memory 20, based on a threshold value for a read-to-write ratio. The read-to-write ratio indicates a ratio of a read count to a write count in the access history of a certain page. The read count may be obtained by counting how many times a read operation is performed on the certain page, and the write count may be obtained by counting how many times a write operation is performed on the certain page. Thus, for example, a page having a read-to-write ratio of 4:1 may indicate the read count of the page is four times higher than the write count of the page. That is, a read operation for the page is performed four times more than a write operation for the page. A page for which a read operation is performed more than a preset number of times is referred to as a "read-intensive page."

The memory controller 30 migrates a page, which has a read-to-write ratio that is equal to or more than the threshold value, from the volatile memory 10 to the nonvolatile memory 20, and migrates a page, which has a read-to-write ratio that is less than the threshold value, from the nonvolatile memory 20 to the volatile memory 10.

The memory controller 30 checks a refresh interval at a preset cycle, and performs the page migration depending on a result of comparing a read-to-write ratio of each page to the threshold value. The preset cycle may indicate a time period at which an interruption to the page migration occurs. In order to prevent performance degradation caused by frequent page migration, the preset cycle may be set to a time period during which a preset number of pages can be migrated at a time. For example, the threshold value for the read-to-write ratio may be set to 4:1, and the preset cycle may be set to a time period of 100 ms.

At each preset cycle, the hybrid memory system according to the embodiment migrates a read-intensive page to the nonvolatile memory 20, and migrates a write-intensive page to the volatile memory 10, depending on the comparison result of the read-to-write ratio of each page and the threshold value. Therefore, the hybrid memory system may have advantages in terms of the performance and energy reduction, and may improve the write endurance of the nonvolatile memory 20, thereby improving the life time of the hybrid memory system.

The memory controller 30 can change the threshold value for the read-to-write ratio, which serves as a reference value for performing page migration between the volatile memory 10 and the nonvolatile memory 20, in response to a refresh interval. The refresh interval changes according to a temperature variation of the volatile memory 10.

The memory controller 30 raises the threshold value for the read-to-write ratio when the refresh interval becomes longer than a preset reference value, and lowers the threshold value for the read-to-write ratio when the refresh interval becomes shorter than the preset reference value. The preset reference value may be set to a time at which an access time of the nonvolatile memory 20 becomes shorter than that of the volatile memory 10, due to the decrease of the refresh interval.

For example, suppose that the read performance of the DRAM serving as the volatile memory 10 may be more degraded than that of the nonvolatile memory 20 when the refresh interval is 16 ms, and the write performance of the DRAM may also be more degraded than that of the nonvolatile memory 20 when the refresh interval is 8 ms. In order to solve such a problem, the memory controller 30 according to the present embodiment migrates a page having a high read-to-write ratio from the volatile memory 10 to the nonvolatile memory 20 when the refresh interval is longer than the preset reference value, and migrates a page having a low read-to-write ratio as well as a page having a high read-to-write ratio from the volatile memory 10 to the nonvolatile memory 20 when the refresh interval is shorter than the preset reference value.

For example, the memory controller 30 sets the threshold value for the read-to-write ratio to 4:1 when the refresh interval is 32 ms or 64 ms, and sets the threshold value for the read-to-write ratio to 1:1 when the refresh interval is shortened to 16 ms or 8 ms while a temperature of the DRAM serving as the volatile memory 10 rises.

Figure 2:
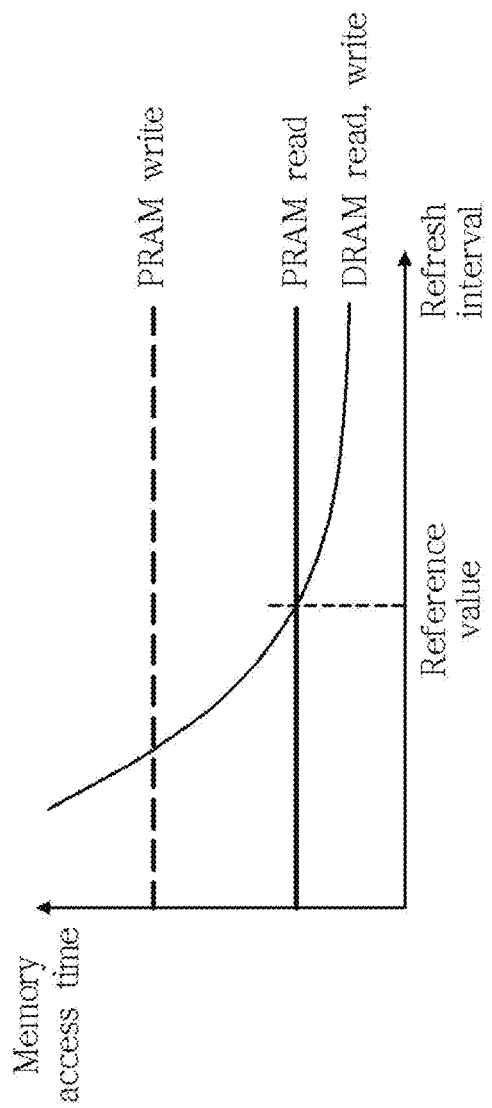
FIG. 2 is a graph illustrating changes in performance of a volatile memory and a nonvolatile memory in a hybrid memory system according to an embodiment.

When the refresh interval is shortened to 16 ms or 8 ms from 32 ms or 64 ms, the access time of the nonvolatile memory 20 becomes shorter than that of the volatile memory 10 (refer to FIG. 2). At this time, since the threshold value for the read-to-write ratio is set to a lower read-to-write ratio, e.g., 1:1, the memory controller 30 migrates a page having a high read-to-write ratio and a page having a low read-to-write ratio from the volatile memory 10 to the nonvolatile memory 20, thereby minimizing the performance degradation. In this embodiment, the high read-to-write ratio and the low read-to-write ratio are greater than the threshold value for the read-to-write ratio, e.g., 1:1. The refresh intervals of 32 ms, 64 ms, 16 ms, and 8 ms and the threshold values of 4:1 and 1:1 are only examples for convenience of description, and do not limit the present embodiment.

As such, when the refresh interval is shortened due to a rise of a temperature of the DRAM serving as the volatile memory 10, the hybrid memory system can also migrate a page having a low read-to-write ratio to the PRAM serving as the nonvolatile memory 20, thereby minimizing performance degradation caused by a refresh overhead.

As described above, the hybrid memory system according to the embodiment can migrate a read-intensive page to the nonvolatile memory 20 when the refresh interval is long, and migrate both a read-intensive page and a write-intensive page to the nonvolatile memory 20 when the refresh interval is short. In an embodiment, the read-intensive page is a page having a read-to-write ratio equal to or greater than 4:1, and the write-intensive page is a page having a read-to-write ratio that is smaller than 4:1 or equal to or greater than 1:1.

FIG. 2 is a graph illustrating changes in performance of a volatile memory and a nonvolatile memory in a hybrid memory system according to an embodiment. For example, the change in performance corresponds to a change of a refresh interval in the hybrid memory system of FIG. 1.

Recently, a memory, such as a HBM (High Bandwidth Memory) in which volatile memories such as DRAMs are three-dimensionally stacked, has been used. A temperature of the DRAM used in the HMB may rise due to an increase of power density. With the rise in the temperature of the DRAM, the data retention time of the DRAM may be shortened. Since the DRAM needs to perform a refresh operation within a short time interval in order to retain data at a high temperature, a refresh interval may be shortened.

FIG. 2 shows that when the refresh interval is longer than a reference value, the volatile memory 10 has a shorter memory access time in read and write operations than the nonvolatile memory 20. However, when the refresh interval is shorter than the reference value, the volatile memory 10 has a longer memory access time in the read operation than the nonvolatile memory 20 due to frequent refresh operations or a refresh overhead, and has a longer memory access time even in the write operation than the nonvolatile memory 20 at a certain threshold value.

For example, when the refresh interval is 16 ms, the nonvolatile memory 20 may exhibit better performance, e.g., a shorter memory access time, than the volatile memory 10 in the read operation, and when the refresh interval is 8 ms, the nonvolatile memory 20 may also exhibit better performance, e.g., a shorter memory access time, than the volatile memory 10 in the write operation.

In the present embodiment, when performing page migration between the volatile memory 10 and the nonvolatile memory 20, the hybrid memory system sets a threshold value for a read-to-write ratio in consideration of the characteristic that the performance of the volatile memory 10 and the nonvolatile memory 20 is changed depending on a refresh interval, and performs the page migration between the volatile memory 10 and the nonvolatile memory 20 depending on whether a read-to-write ratio of a page is equal to or greater than the threshold value. Through this operation, the hybrid memory system according to the present embodiment can minimize performance degradation, thereby improving the performance while reducing energy consumption.

Figure 3:
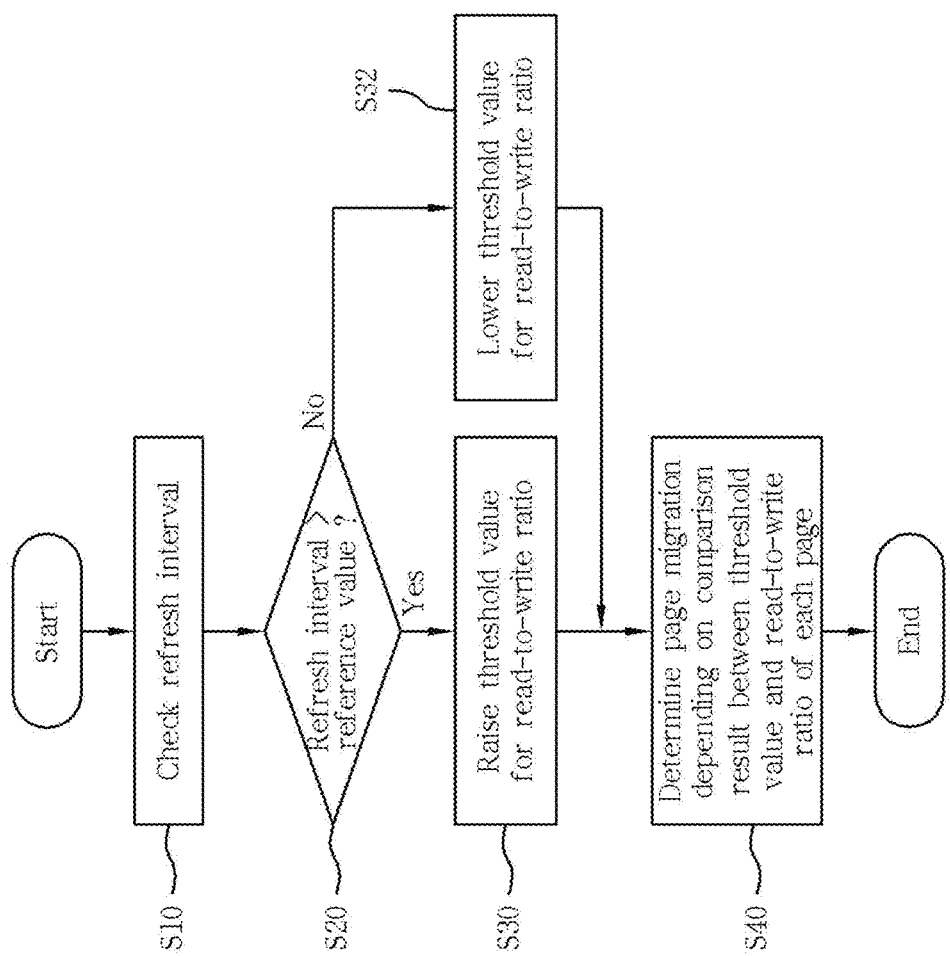
FIG. 3 is a flowchart for describing a control method of a hybrid memory system according to an embodiment.

FIG. 3 is a flowchart for describing a control method of a hybrid memory system according to an embodiment.

Referring to FIGS. 1 and 3, the memory controller 30 checks a refresh interval at a preset cycle at S10. The preset cycle may be set to a time period during which a preset number of pages can be migrated at the same time in order to prevent frequent page migration between the volatile memory 10 and the nonvolatile memory 20. For example, the preset cycle may be set to a time period of 100 ms.

The memory controller 30 determines whether the refresh interval is longer or shorter than a preset reference value at S20. The preset reference value may be set to a time at which an access time of the volatile memory 10 becomes longer than that of the nonvolatile memory 20, due to the decrease of the refresh interval.

When it is determined that the refresh interval is longer than the preset reference value, the memory controller 30 raises a threshold value for a read-to-write ratio at S30. When it is determined that the refresh interval is shorter than the preset reference value, the memory controller 30 lowers the threshold value for the read-to-write ratio at S32.

For example, the memory controller 30 sets the threshold value for the read-to-write ratio to 4:1 when the refresh interval is 32 ms or 64 ms, which is longer than the preset reference value, and sets the threshold value for the read-to-write ratio to 1:1 when the refresh interval is shortened to 16 ms or 8 ms, which is shorter than the preset reference value, when a temperature of the volatile memory 10 rises. At this time, the threshold values of 4:1 and 1:1 are only an example for convenience of description, and do not limit the present embodiment.

The memory controller 30 compares a read-to-write ratio of each page to the set threshold value, and performs page migration according to the comparison result, at S40.

For example, when the threshold value is set to 4:1, the memory controller 30 migrates a page having a read-to-write ratio that is equal to or greater than the threshold value from the volatile memory 10 to the nonvolatile memory 20, and migrates a page having a read-to-write ratio that is less than the threshold value from the nonvolatile memory 20 to the volatile memory 10. That is, the memory controller 30 migrates a read-intensive page to the nonvolatile memory 20, and migrates a write-intensive page to the volatile memory 10.

In this example, the page having the read-to-write ratio that is equal to or greater than the threshold value corresponds to the read-intensive page, and the page having the read-to-write ratio that is less than the threshold value corresponds to the write-intensive page.

For example, when the threshold value is set to 1:1, the memory controller 30 migrates the read-intensive page and the write-intensive page from the volatile memory 10 to the nonvolatile memory 20. When the refresh interval is shortened to 16 ms or 8 ms, the nonvolatile memory 20 exhibits better performance than the volatile memory 10, and thus migrates the read-intensive page and the write-intensive page from the volatile memory 10 to the nonvolatile memory 20. In this example, both the read-intensive page and the write-intensive page have read-to-write ratios that are equal to or greater than 1:1 so that both the read-intensive page and the write-intensive page are migrated from the volatile memory 10 to the nonvolatile memory 20.

As such, the control method according to the present embodiment sets the threshold value for the read-to-write ratio, serving as a reference value for performing the page migration between the volatile memory 10 and the nonvolatile memory 20, in consideration of the refresh interval, and performs the migration of each page based on the threshold value. Therefore, the control method can minimize performance degradation caused by a refresh overhead, and improve the performance of the hybrid memory system.

The present embodiment may be configured to update a read-to-write ratio for each page in a page table, and reflect a result of the page migration into the page table.

Furthermore, the present embodiment may be configured to select a page to migrate, which is among the pages that are accessed in a certain period of time during which the page migration is performed. For example, when the certain period of time required for performing the page migration is 100 ms, a page to migrate may be selected among the pages accessed for a second half, e.g., 50 ms, of the certain period of time.

Furthermore, the present embodiment may be configured to restrict or interrupt, at a current cycle, the migration of a page that has been migrated at a previous cycle, in order to prevent ping-pong page migration at each cycle.

According to the present embodiment, the hybrid memory system and the control method thereof can perform the page migration in consideration of a refresh interval, thereby minimizing performance degradation caused by a refresh overhead of the volatile memory.

Furthermore, the hybrid memory system and the control method thereof can change the threshold value for the read-to-write ratio, serving as the reference value for performing the page migration between the volatile memory and the nonvolatile memory, in consideration of the refresh interval. Thus, the hybrid memory system and the control method thereof can minimize performance degradation, even when the refresh interval is shortened due to a rise in a temperature of the volatile memory.

Furthermore, since the page migration between the volatile memory and the nonvolatile memory is performed based on the threshold value that is changed in consideration of the refresh interval, the performance of the hybrid memory system can be improved while the energy consumption thereof is reduced, and the write endurance of the nonvolatile memory can be improved.

Although various embodiments have been described for illustrative purposes, it will be apparent to those skilled in the art that various changes and modifications may be made without departing from the spirit and scope of the disclosure as defined in the following claims.

What is claimed is:

1. A hybrid memory system comprising:
a volatile memory;
a nonvolatile memory; and a memory controller configured to set a threshold value for a read-to-write ratio according to a refresh interval of the volatile memory, and to perform migration of a page between the volatile memory and the nonvolatile memory based on the threshold value and a read-to-write ratio of the page, wherein the memory controller checks the refresh interval at a preset cycle and changes the threshold value for the read-to-write ratio in response to a change of the refresh interval.

2. The hybrid memory system of claim 1, wherein the volatile memory and the nonvolatile memory have different physical addresses and constitute a main memory at the same hierarchy.

3. The hybrid memory system of claim 1, wherein the memory controller migrates a page having a read-to-write ratio that is equal to or greater than the threshold value to the nonvolatile memory, and migrates a page having a read-to-write ratio that is less than the threshold value to the volatile memory.

4. The hybrid memory system of claim 1, wherein the memory controller raises or lowers the threshold value for the read-to-write ratio according to whether the refresh interval is longer or shorter than a preset reference value.

5. The hybrid memory system of claim 4, wherein the preset reference value is set to a time at which an access time of the volatile memory becomes longer than an access time of the nonvolatile memory when the refresh interval is decreased.

6. The hybrid memory system of claim 5, wherein the memory controller migrates a read-intensive page to the nonvolatile memory when the refresh interval is longer than the preset reference value, and migrates a read-intensive page and a write-intensive page to the nonvolatile memory when the refresh interval is equal to or shorter than the preset reference value.

7. The hybrid memory system of claim 6, wherein the read-intensive page is a page having a first read-to-write ratio that is equal to or greater than a first threshold value, and the write-intensive page is a page having a second read-to-write ratio that is equal to or greater than a second threshold value, and wherein the first read-to-write ratio is greater than the second read-to-write ratio, and the first threshold value is greater than the second threshold value.

8. The hybrid memory system of claim 1, wherein the memory controller allocates all pages to the volatile memory when the pages are initially allocated.

9. A control method of a hybrid memory system, comprising:

setting a threshold value for a read-to-write ratio according to a refresh interval; and performing migration of a page between a volatile memory and a nonvolatile memory in the hybrid memory system, based on the threshold value and a read-to-write ratio of the page, wherein setting the threshold value comprises:

checking the refresh interval at a preset cycle; and changing the threshold value for the read-to-write ratio according to whether the refresh interval is longer or shorter than a preset reference value.

10. The control method of claim 9, wherein the preset reference value is set to a time at which an access time of the volatile memory becomes longer than that of the nonvolatile memory when the refresh interval is decreased.

11. The control method of claim 9, wherein performing the migration of the page comprises migrating a read-intensive page to the nonvolatile memory when the refresh interval is longer than the preset reference value, and migrating a read-intensive page and a write-intensive page to the nonvolatile memory when the refresh interval is equal to or shorter than the preset reference value.

12. The control method of claim 11, wherein the read-intensive page is a page having a first read-to-write ratio that is equal to or greater than a first threshold value, and the write-intensive page is a page having a second read-to-write ratio that is equal to or greater than a second threshold value, and wherein the first read-to-write ratio is greater than the second read-to-write ratio, and the first threshold value is greater than the second threshold value.

13. The control method of claim 9, further comprising: allocating all pages to the volatile memory when the pages are initially allocated.

14. The control method of claim 9, wherein performing the migration of the page further comprises determining a page to migrate among pages accessed for a part of the preset cycle.

15. The control method of claim 9, wherein performing the migration of the page further comprises restricting migration of a page in a current cycle when the page has been migrated at a previous cycle.

* * * * *